(12) United States Patent
Ansari et al.

(10) Patent No.: US 8,095,006 B2
(45) Date of Patent: Jan. 10, 2012

(54) CONFIGURATION OF PASSIVE OPTICAL NETWORKS INCLUDING CASCADED ARRAY WAVEGUIDE GRATINGS

(75) Inventors: Nirwan Ansari, Montville, NJ (US); JingJing Zhang, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 556 days.

(21) Appl. No.: 12/389,909

(22) Filed: Feb. 20, 2009

(65) Prior Publication Data

US 2010/0215361 A1   Aug. 26, 2010

(51) Int. Cl.
*H04J 14/00* (2006.01)
(52) U.S. Cl. .......................................... 398/68
(58) Field of Classification Search ............... 398/63, 398/68
See application file for complete search history.

(56) References Cited

OTHER PUBLICATIONS

C. Bock et al., "Hybrid WDM/TDM PON Using the AWG FSR and Featuring Centralized Light Generation and Dynamic Bandwidth Allocation", Journal of Lightwave Technology, vol. 23, No. 12, Dec. 2005.*

I. Tsalamanis et al., "Study of Hybrid Cascaded AWG-based Access Network Topology", ICTON 2006.*
Kani, J., Teshima, J., Akimoto, K., Takachio, N. Suzuki, H., Iwatsuki, K., and Ishii, M., "A WDM-based optical access network for wide-area gigabitaccess services," IEEE Commun. Mag., vol. 41, pp. S43-S48, Feb. 2003.
Maier, G., Martinelli, M., Pattavina, A., and Salvadori, E. "Design and cost performance of the multistage WDM-PON access networks." J. Lightwav, Technol., vol. 18, No. 2, pp. 125-143, Feb. 2000.
Lee, S-M., Mun, S-G., Kim, M-H., and Lee, C-H, "Demonstration of a Long-Reach DWDM-PON for Consolidation of Metro and Access Networks" J Lightwave Technol., vol. 25, pp. 271-276 Jan. 2007.
Johnson, D.S. and Niemi, K.A. (1983). On Knapsacks, Partitions, and a New Dynamic Programming Technique for Trees. Math. Oper. Res. 8., Feb. 1983.

* cited by examiner

*Primary Examiner* — Shi K Li
(74) *Attorney, Agent, or Firm* — Baker Hostetler LLP

(57) ABSTRACT

Techniques for partitioning and/or combining at least a portion of an optical network tree including one or more array waveguide gratings ("AWGs") and fibers in wavelength division multiplexing ("WDM") passive optical networks ("PON") with cascaded AWGs are disclosed. Example methods include deriving the optimal positions for the AWGs to minimize fiber cost and then determining the arrangement of cascaded AWGs to minimize the total cost of AWGs and fibers. Determining the arrangement of cascaded AWGs may include recursive partitioning followed by recursive combination. An example recursive partition-combination based algorithm for optimizing a tradeoff between the AWG cost and the fiber cost is disclosed.

25 Claims, 14 Drawing Sheets

$L=\{T\}$   %Initially, $L$ contains only tree $T$, which covers all subscribers
While $L \neq \emptyset$
   For any $t \in L$
      A:=minimum cost AWG structure;
      B:=secondary minimum cost AWG structure;
      for A, calculate the total cost $C_1$;
      for B, partition $t$ into $t_1$ and $t_2$, and calculate the total cost $C_2$;
      If $C_2 < C_1$, accept the partition, $L = L \cup \{t_1, t_2\}$ ;
      If $C_1 \geq C_2$, reject the partition;
   $L = L \setminus \{t\}$

FIG. 4

$t:=$ trees composed of $1 \times 2$ AWGs after partition

%*vertical combination*

While $t$ has leaves $a:=$the deepest leaf of $t$; $b:=$the sibling of a; $c:=$the parent of a;

$C_1:=$ the cost of the tree comprised of a,b,c;

$C_2:=$the cost of the tree if a,b,c are combined;

*If* $C_2 < C_1$, accept the combination;

$t = t \backslash \{a,b\}$;

%*horizontal combination*

For the roots of each tree,

For the AWGs with the same size compare the total cost for combining and not combining;

decide whether to combine or not;

```
┌─────────────────────────────────────────────────────────────────┐
│ partitioning an optical network tree into a plurality of subtrees, one or more of said │
│ plurality of subtrees including a distribution array waveguide grating connected to a  │
│ plurality of subscribers and to a network optical line termination │
└─────────────────────────────────────────────────────────────────┘
                                    ↓    ＼402
┌─────────────────────────────────────────────────────────────────┐
│ horizontally partitioning at least one subtree by replacing at least one of a multiple- │
│ input/multiple-output intermediate array waveguide grating and a multiple- │
│ input/multiple-output distribution array waveguide grating with an equivalent │
│ arrangement of single-input/multiple-output array waveguide gratings │
└─────────────────────────────────────────────────────────────────┘
                                    ↓    ＼404
┌─────────────────────────────────────────────────────────────────┐
│ vertically partitioning at least one subtree by selectively replacing at least one of │
│ the single-input/multiple-output array waveguide gratings with a respective │
│ equivalent cascaded arrangement including a single-input/double-output array │
│ waveguide grating and two or more smaller single-input/multiple-output array │
│ waveguide gratings, where one or more of the smaller single-input/multiple-output │
│ array waveguide gratings includes fewer outputs than the respective one single- │
│ input/multiple-put array waveguide grating │
└─────────────────────────────────────────────────────────────────┘
                                    ↓    ＼406
┌─────────────────────────────────────────────────────────────────┐
│ vertically combining at least one subtree by selectively replacing at least one │
│ cascaded arrangement of at least three single-input/multiple-output intermediate │
│ array waveguide gratings with an equivalent single-input/multiple-output array │
│ waveguide grating │
└─────────────────────────────────────────────────────────────────┘
                                    ↓      ＼408    ╱410
┌─────────────────────────────────────────────────────────────────┐
│ horizontally combining at least one subtree by selectively replacing at least two │
│ intermediate array waveguide gratings connected nearest the network optical line │
│ termination with an equivalent multiple-input/multiple-output array waveguide │
│ grating │
└─────────────────────────────────────────────────────────────────┘
```

FIG. 7

```
┌─────────────────────────────────────────────────────────────┐
│ calculating a first arrangement of a plurality of array     │
│ waveguide gratings and fibers interconnecting an optical    │
│ line termination and a plurality of subscribers to minimize │
│ a fiber cost, the first arrangement including a plurality   │
│ of subtrees                                                 │
└─────────────────────────────────────────────────────────────┘
                              ↓                         ⬊ 412
┌─────────────────────────────────────────────────────────────┐
│ calculating a second arrangement of array waveguide         │
│ gratings having a minimum total cost of array waveguide     │
│ gratings and fibers                                         │
│                                                             │
│        ┌──────────────────────────────────────────┐         │
│        │ recursively partitioning at least one    │──416    │
│        │ subtree                                  │         │
│        └──────────────────────────────────────────┘         │
│                          ↓                                  │
│        ┌──────────────────────────────────────────┐         │
│        │ recursively vertically combining at      │──418    │
│        │ least one subtree                        │         │
│        └──────────────────────────────────────────┘         │
│                          ↓                                  │
│        ┌──────────────────────────────────────────┐         │
│        │ horizontally combining at least one      │──420    │
│        │ subtree                                  │         │
│        └──────────────────────────────────────────┘         │
└─────────────────────────────────────────────────────────────┘
                                                        ⬊ 414
```

FIG. 8

CONFIGURATION OF PASSIVE OPTICAL NETWORKS INCLUDING CASCADED ARRAY WAVEGUIDE GRATINGS

BACKGROUND

The present disclosure is directed to techniques for partitioning and/or combining at least a portion of an optical network tree including one or more array waveguide gratings ("AWGs"). More specifically, example methods disclosed herein include a recursive partition-combination based algorithm for improving (and, possibly, optimizing) a tradeoff between the AWG cost and the fiber cost.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 is an example recursive partitioning algorithm;

FIG. 5 is an example recursive combination algorithm;

FIG. 7 is a flowchart depicting the operation of an example computer-implemented method for determining an arrangement of an optical network;

FIG. 8 is a flowchart depicting the operation of an example computer-implemented method for determining an arrangement of an optical network.

DETAILED DESCRIPTION

Figure 1:
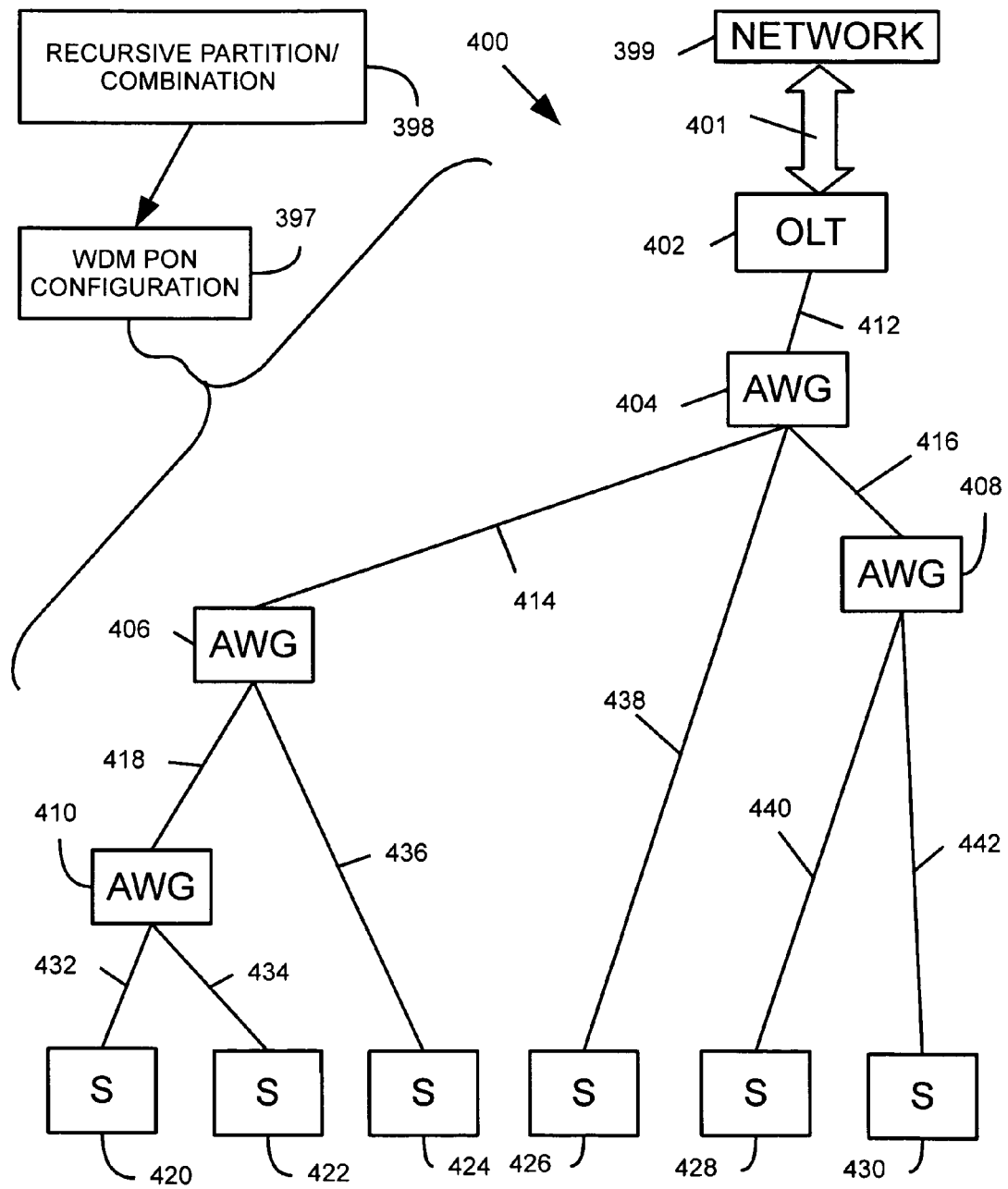
FIG. 1 is a block diagram of an example wavelength division multiplexing passive optical network determined using an example recursive partition/combination method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, among other things, methods, apparatus, computer programs, and systems related to reducing capital expenditure on array waveguide gratings ("AWGs") and fibers in the deployment of wavelength division multiplexing ("WDM") passive optical networks ("PON") with cascaded AWGs. Specifically, this disclosure provides an example recursive partition-combination algorithm which may achieve improved tradeoff between the AWG cost and the fiber cost.

Example embodiments include techniques for partitioning and/or combining at least a portion of an optical network tree including one or more array waveguide gratings ("AWGs") and fibers in wavelength division multiplexing ("WDM") passive optical networks ("PON") including cascaded AWGs. Some example methods include deriving the optimal positions for the AWGs to minimize fiber cost and then determining the arrangement of cascaded AWGs to minimize the total cost of AWGs and fibers. Determining the arrangement of cascaded AWGs may include recursive partitioning followed by recursive combination. An example recursive partition-combination based algorithm for optimizing a tradeoff between the AWG cost and the fiber cost is disclosed.

The present disclosure contemplates that WDM PON is a future-proof broadband access technology that may exploit the bandwidth capability of optical fibers, as discussed in J. Kani, M. Teshima, K. Akimoto, N. Takachio, H. Suzuki, K. Iwatsuki, and M. Ishii, "A WDM-based optical access network for wide-area gigabit access services," IEEE Commun. Mag., vol. 41, pp. S43-S48, February 2003, which is incorporated by reference. WDM PON may employ AWGs to demultiplex fibers into multiple wavelengths, which may be assigned to different subscribers. The present disclosure contemplates that, owing to the cyclic property of AWGs, AWGs can be cascaded to provide a demultiplexing function as discussed in G. Maier, M. Martinelli, A. Pattavina, E. Salvadori, "Design and cost performance of the multistage WDM-PON access networks," J. Lightwave. Technol., vol. 18, no. 2, pp. 125-143, February 2000, which is incorporated by reference. Cascaded AWGs and optical fibers may contribute to the capital expenditure ("CAPEX") of an optical distribution network ("ODN") in deploying WDM PON. The present disclosure contemplates that planning an ODN for minimum CAPEX may be an important issue, especially for long-reach PONs covering broad areas with diversified subscriber densities as discussed in S. M. Lee, S. G. Mun, M. H. Kim, and C. H. Lee, "Demonstration of a Long-Reach DWDM-PON for Consolidation of Metro and Access Networks," J. Lightwave. Technol., vol. 25, pp. 271-276, 2007, which is incorporated by reference.

FIG. 1 is a block diagram of an example WDM PON 400, described by an example WDM PON configuration 397, which may be determined using an example recursive partition/combination method 398 in accordance with the present disclosure. The example WDM PON 400 may include an optical line termination ("OLT") 402 connected to a plurality of cascaded AWGs 404, 406, 408, 410 by optical fibers 412, 414, 416, 418. The cascaded AWGs 404, 406, 408, 410 may be connected to subscribers 420, 422, 424, 426, 428, 430 by optical fibers 432, 434, 436, 438, 440, 442. The OLT 402 may be connected to a network 399 (such as the Internet) via a connection 401.

As discussed in detail below, the example recursive partition/combination method 398 may result in a configuration 397, which may describe the arrangement of the WDM PON 400. The WDM PON 400 of FIG. 1 may be operative to convey data between the subscribers 420, 422, 424, 426, 428, 430 and the network 399. For example, subscriber 424 may transmit data to the network 399 via optical fiber 436, AWG 406, optical fiber 414, AWG 404, optical fiber 412, OLD 402, and connection 401. Similarly, the network 399 may transmit data to subscriber 428 via connection 401, OLT 402, optical fiber 412, AWG 404, optical fiber 416, AWG 408, and optical fiber 440.

The present disclosure contemplates that, in some cases, planning an ODN may include addressing several problems, such as selecting AWGs of appropriate sizes and/or finding suitable positions for AWGs and/or optical fibers. These tasks may determine the total cost of AWGs and fibers. Minimizing this total cost is NP-hard (nondeterministic polynomial-time hard), as may be many of the planning problems.

In an example method, cost minimization may be divided into two problems. First, given a cascaded AWG structure, the AWGs and fibers may be located so as to minimize the fiber cost. Second, the cascaded AWG structure with the minimum total cost of AWGs and fibers may be determined.

The first problem may involve graph partitioning to determine the subscribers connected to individual AWGs. This graph partitioning problem is NP-complete. An example method may utilize a heuristic bottom-up tree-partition algorithm to determine the subscribers connected to individual AWGs and to derive the positions for the AWGs to solve the first problem (locating the AWGs and fibers).

The second problem may involve optimizing a tradeoff between the AWG cost and fiber cost. For the AWG cost, one economic scheme may be one large AWG for all subscribers. However, such an arrangement may incur a high fiber cost because subscribers may utilize separate fibers to connect to the one large AWG. The alternative arrangements may include multi-stage cascaded AWGs with smaller sizes. With cascaded smaller AWGs, the fiber cost may be reduced at the expense of increasing the AWG cost. One example method to determine such a tradeoff may be to calculate the total costs for every possible combination of AWGs. However, the number of possible combinations increases exponentially with an increase in the number of subscribers, and it may be very time consuming to check such possible combinations. To solve the second problem (minimizing the total cost of AWGs and fibers), an example method may employ a recursive partition-combination algorithm to avoid an exhaustive search of such possible combinations of AWGs.

In example embodiments, because many areas may have existing infrastructure for other services, existing infrastructure may be utilized and the example methods may not consider the expensive deployment cost. It may be assumed that the existing infrastructure forms a tree structure with an OLT as the root and with subscribers distributed along the tree. In some example embodiments, individual subscribers may use one wavelength for both the upstream and downstream transmission. However, example algorithms may be tailored to other situations, such as to accommodate individual subscribers using multiple wavelengths, for example. Example embodiments may also be utilized in the planning of time division multiplexing ("TDM") PONs and hybrid WDM/TDM PONs, for example, as well as other types of networks.

As discussed above, in an example embodiment, AWGs may provide the demultiplexing function in a WDM PON. The present disclosure contemplates that signals in an AWG may be cyclically routed with the rule that wavelength $l_f$ from input i may be routed to output mod(i−2+f, N)+1, where N may represent the number of AWG ports. Owing to the cyclical property of AWGs, multiple wavelengths can be routed through a single fiber, thus facilitating AWG cascading.

Figure 2A:
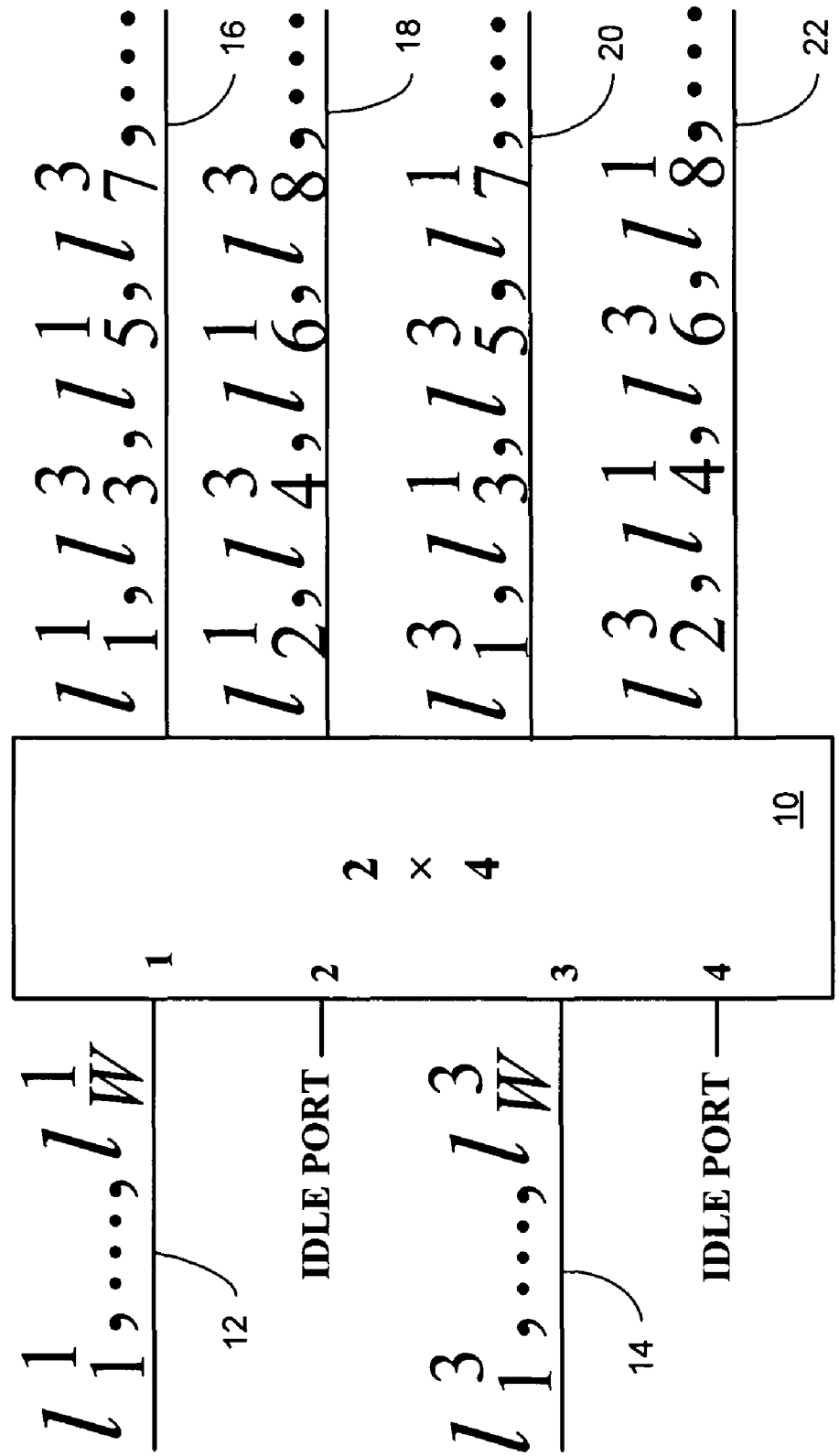
FIGS. 2A and 2B are schematic diagrams of examples of equivalent AWG arrangement in which wavelengths in two fibers may be demultiplexed into four fibers.
Figure 2B:
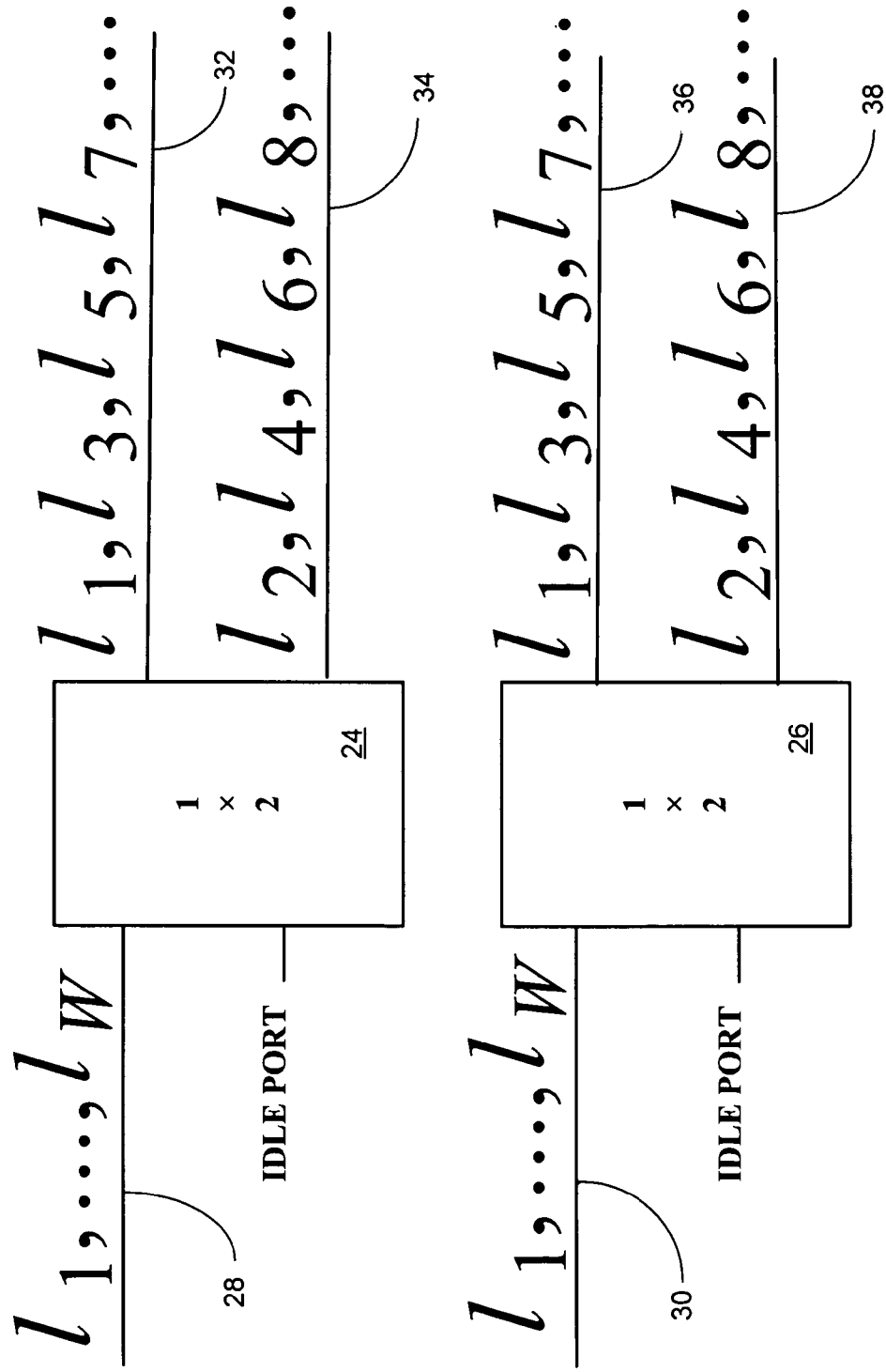

As used herein, equivalent AWG arrangements may include similar or comparable (but not necessarily identical) inputs and outputs. For example, FIGS. 2A and 2B are schematic diagrams of examples of equivalent AWG arrangements in which wavelengths in two fibers may be demultiplexed into four fibers. In FIG. 2A, fibers 12, 14 may be demultiplexed into fibers 16, 18, 20, 22 by AWG 10. In FIG. 2B, fiber 28 may be demultiplexed into fibers 32, 34 by AWG 24, and fiber 30 may be demultiplexed into fibers 36, 38 by AWG 26.

Figure 2C:
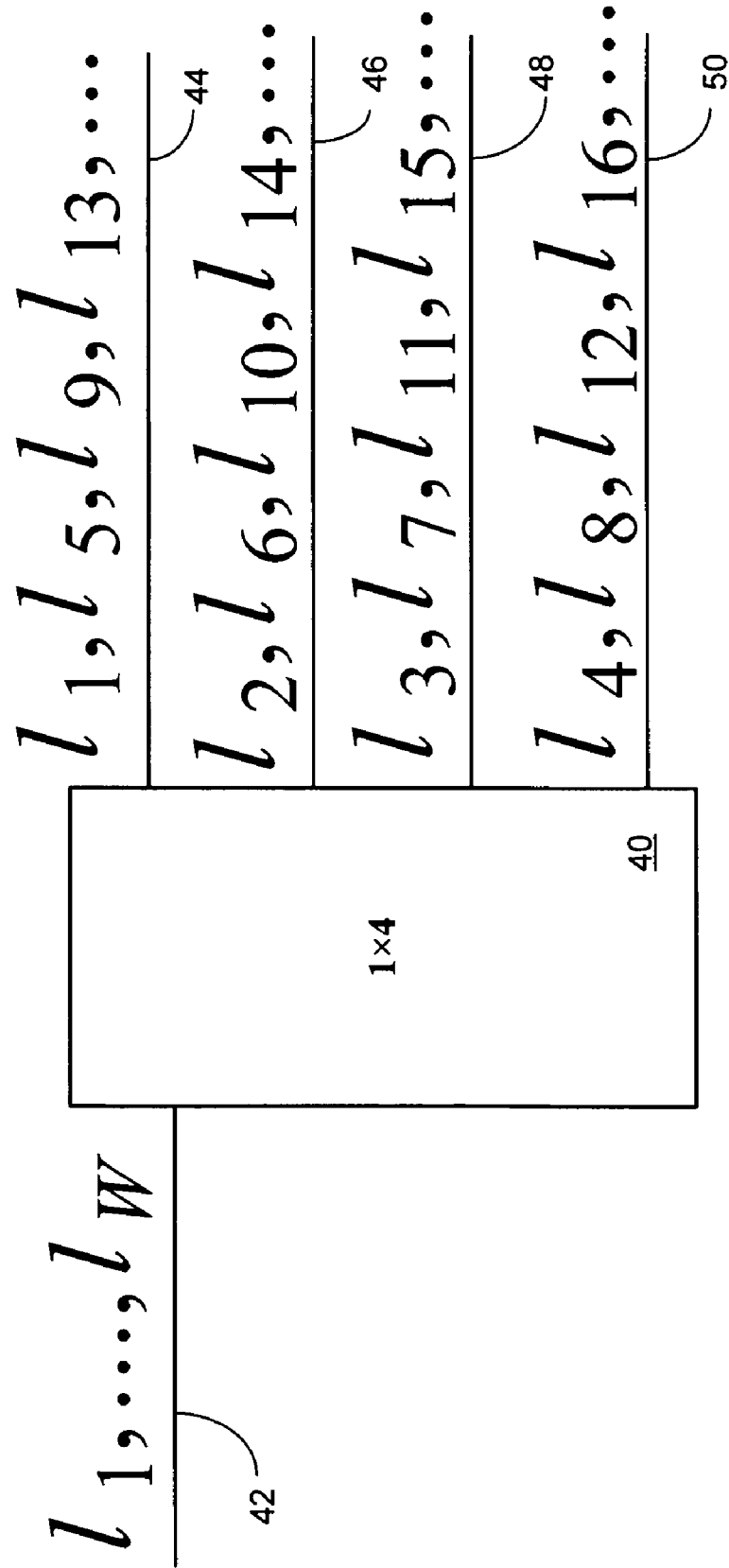
FIGS. 2C and 2D are schematic diagrams of examples of equivalent AWG arrangement in which one fiber may be demultiplexed into four fibers.
Figure 2D:
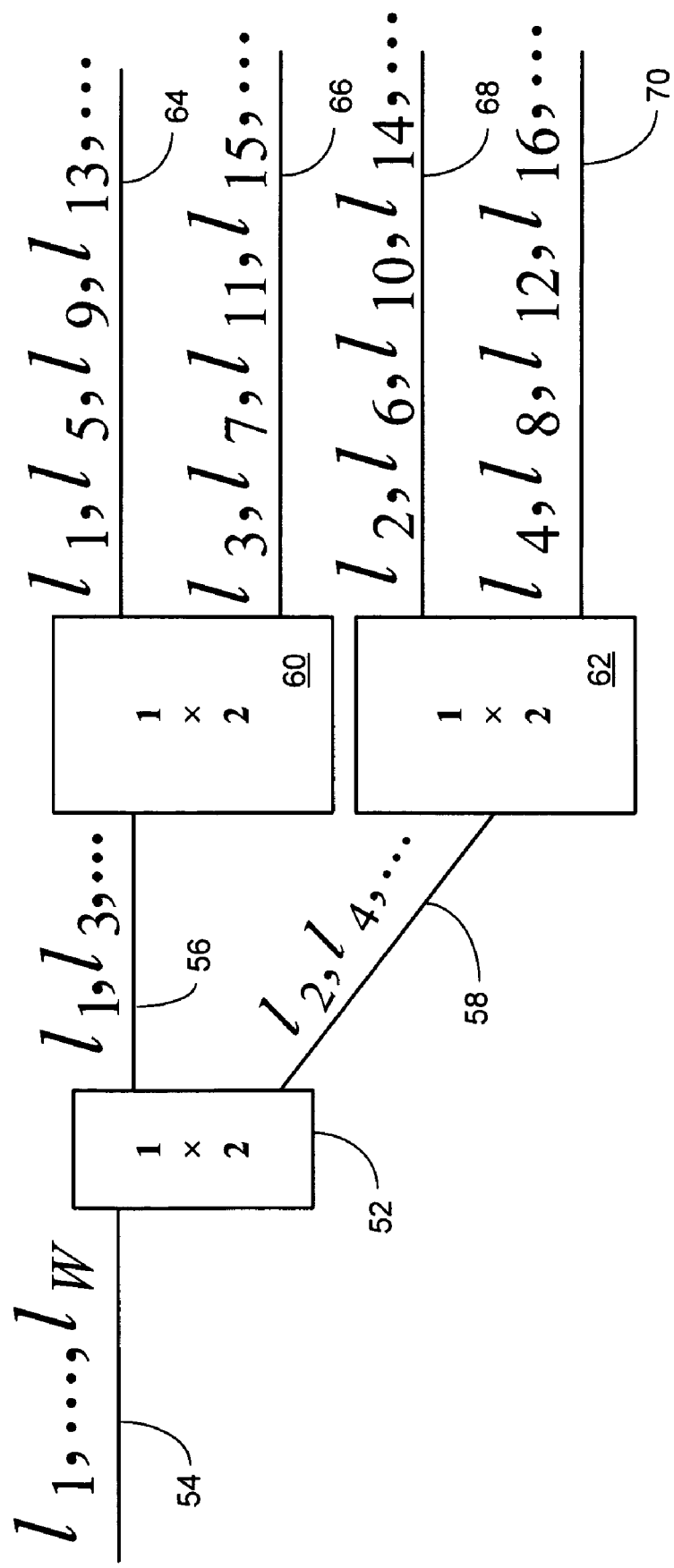

FIGS. 2C and 2D are schematic diagrams of examples of equivalent AWG arrangements in which one fiber may be demultiplexed into four fibers. In FIG. 2C, fiber 42 may be demultiplexed into fibers 44, 46, 48, 50 by AWG 40. In FIG. 2D, fiber 54 may be demultiplexed into fibers 56, 58 by AWG 52, and fibers 56, 58 may be demultiplexed into fibers 64, 66, 68, 70 by AWGs 60, 62.

Figure 3:
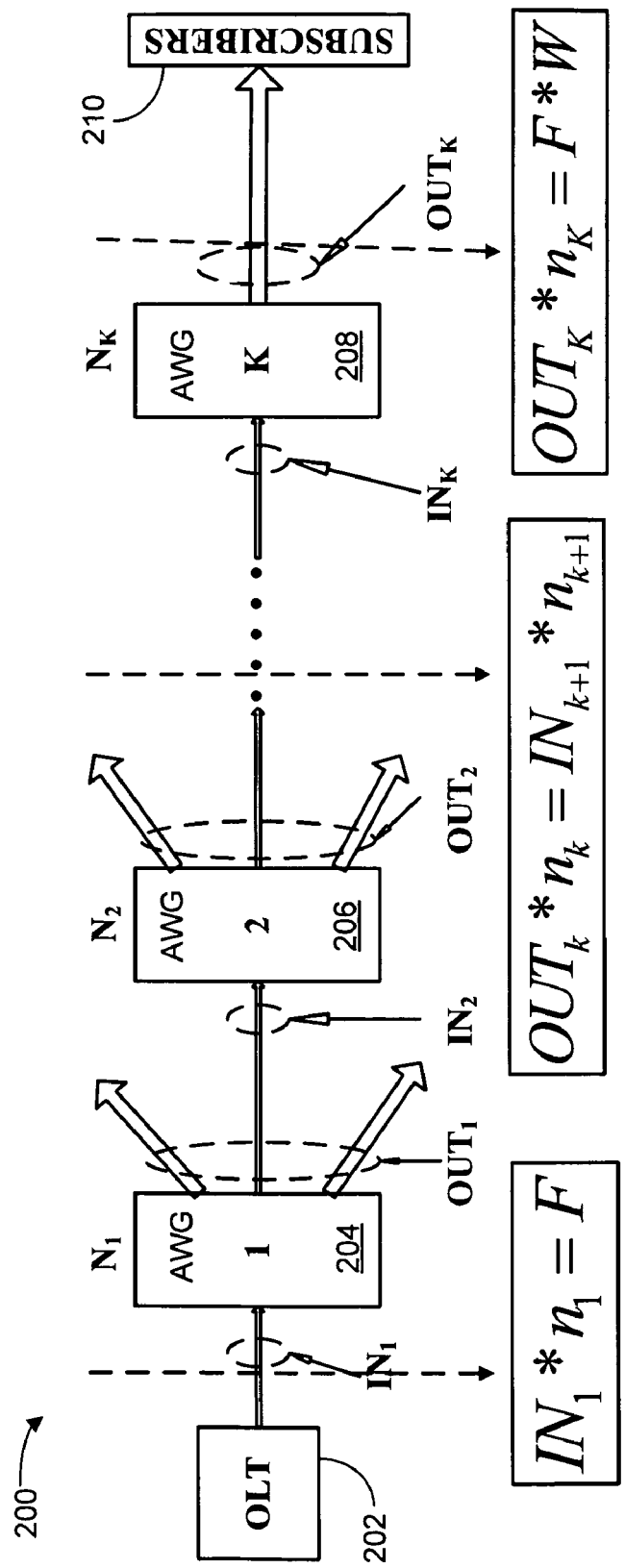
FIG. 3 is a schematic diagram of an example generalized cascaded AWG structure.

The present disclosure contemplates that, as shown in FIG. 2D, AWGs may be cascaded. FIG. 3 is a schematic diagram of an example generalized cascaded AWG structure 200. In this example arrangement, OLT 202 may be connected to a first AWG 104 via fiber IN1. The first AWG 204 may demultiplex fiber IN1 into a plurality of fibers OUT1, one of which (IN2) may be connected to the second AWG 206. The second AWG 206 may demultiplex fiber IN2 into a plurality of fibers OUT2. The arrangement continues until it reaches AWG K 208, which may demultiplex fiber INK into one or more outputs including OUTK. Fiber OUTK may be connected to a subscriber 210.

In the example arrangement of FIG. 3, the OLT 202 may transmit data to the subscriber 210 via fiber IN1, first AWG 204, fiber IN2, second AWG 206, fiber INK, AWG K 208, and fiber OUTK.

As used herein, an AWG connecting directly to one or more subscribers may be referred to as a distribution AWG (such as AWG K 208 in FIG. 3), and any other AWG may be referred to as an intermediate AWG (such as AWG 1 204 and AWG 2 206 in FIG. 3).

The present disclosure contemplates that, although typical commercially available AWGs may support 2, 4, 8, 16, 32, or 64 ports, AWGs providing any number of ports may be utilized. In an example embodiment, equally and/or approximately equally spaced input ports may be utilized so that channels in an output port of an AWGs may equally and/or approximately equally spaced.

The present disclosure contemplates that different AWG combinations may introduce different costs. Currently, the larger the number of AWG ports, the higher the price of AWG, and the smaller the price per port. This can be expressed, for example, as $\forall x > y$, $p(x) > p(y)$, $p(x)/x < p(y)/y$, where $p(x)$ may represent the price of an AWG with x ports and $p(y)$ may represent the price of an AWG with y ports. So, the AWGs 10, 40 in FIGS. 2A and 2C may cost less than the AWGs 24, 26, 52, 60, 62 in FIGS. 2B and 2D, respectively.

The present disclosure contemplates that the cost of a WDM PON may be calculated. Let F be the number of fibers from an OLT, W be the number of wavelengths in one fiber, K be the number of stages, $n_k$ be the number of AWGs in stage k, and $IN_k$ and $OUT_k$ be the number of used input ports and output ports of AWGs in stage k, respectively. Then, $IN_1 * n_1 = F$, $OUT_K * n_K = F*W$, $OUT_k * n_k = IN_{k+1} * n_{k+1}$, and th AWG cost in stage k may be given by the following equation.

$$AWGcost = F * W * \frac{p(OUT_k)}{OUT_k} * \prod_{i=k+1}^{K} \frac{IN_i}{OUT_i}$$

The present disclosure contemplates that the following properties of the cost of cascaded AWGs may be derived:

To demultiplex A fibers into B subscribers, the minimum cost AWG may be the one AWG with size A×B;

To demultiplex A fibers into B subscribers (A>1), the secondary minimum cost may be two AWGs with size A/2× B/2;

To demultiplex one fiber into B subscribers, the secondary choice may be a two-stage cascaded AWG including two AWGs of size 1×B/2 and one AWG of size 1×2.

The present disclosure contemplates that, in some cases, the cost of fibers for connections between subscribers and distribution AWGs may exceed that for connections among AWGs. Thus, minimizing the fibers connecting subscribers and distribution AWGs may result in cost savings.

Given the positions of the OLT and the subscribers, as well as the cascaded AWG architecture, an example method may include two tasks for minimizing the fiber cost. First, the tree formed by existing constructions may be partitioned into subtrees to determine which subscribers will be served by individual distributed AWGs. Second, an AWG may be placed at the centroid of the partitioned subtree.

The present disclosure contemplates that it may be useful to minimize the fiber length between subscribers and their respective distribution AWGs. In an example method, the partitioning problem may be formulated as: given a subscriber set V, it may be useful to find a partition $V=V_1 \cup V_2 \cup \ldots \cup V_m$, $|V_i|=|V|/m$, $\forall i \in [1,m]$ such that the length of the edges connecting the set may be minimized. The present disclosure contemplates that a conventional heuristic bottom-up algorithm may be used to solve this tree-partitioning problem, which may be NP-complete, as discussed in D. S. Johnson, K. A. Niemi, "On Knapsacks, Partitions, and a New Dynamic Programming Technique for Trees," Mathematics of Operations Research, Vol. 8 No. 1, 1983, which is incorporated by reference.

In an example method, after defining a subtree, an AWG may be placed at the centroid of the subtree to minimize the fiber length. Given a tree T=(V,E) with n vertices, the centroid may be the vertex such that no subtrees of size n/2 can be generated if the centroid is removed.

Given the subtree, which may include the subscribers to be connected to one AWG, the centroid of the tree may be the optimal position for the minimum fiber length. This proposition may be proved as follows. For any two vertices, u,v, (u,v) ∈ E, let the size (i.e., the number of vertices) of subtrees generated by removing u be $\{st_1, st_2, \ldots, st_m\}$. Without loss of generality, assume v is in subtree $st_1$. If the AWG is placed at u, the number of fibers in (u,v) is $st_1$; if the AWG is placed at v, the number of fibers in (u,v) may be given by the following equation.

$$\text{number of fibers in } (u, v) = \sum_{i=2}^{m} st_i$$

For the above two placement schemes, the fiber placements are the same and/or similar in all the other edges except (u,v). So, v may be favored over u in cases where the following inequality is satisfied.

$$\sum_{i=2}^{m} st_i < st_1$$

In other words, when there may be no sub-tree i satisfying the following inequality, the corresponding vertex may be the optimal position of the AWG. This vertex is the centroid of the tree.

$$st_i > \sum_{j \neq i} st_j$$

The present disclosure contemplates that, in some cases, the fiber cost and AWG cost may have a tradeoff. Generally, the higher the number of AWG stages, the larger the AWG cost, and the smaller the fiber cost. As mentioned above, one way to derive the AWG arrangement with the minimum total cost may be to check possible AWG combinations. However, let q(x) be the number of AWG combinations which demultiplex one fiber into x subscribers. Then, $q(2^k)=[q(2^{k-1})]^{2^1}[+ q(2^{k-2})]^{2^2} + \ldots + [q(1)]^{2^k}$. The number of combinations increases exponentially with an increase in the number of subscribers.

To avoid an exhaustive search of such possible combinations of AWGs, an example recursive partition-combination algorithm may be employed. An example algorithm may include two actions: recursive partitioning (see, e.g., FIG. 4) and recursive combination (see, e.g., FIG. 5). In example embodiments, for any given tree, the cascaded AWG structures with the minimum cost (A) and secondary minimum cost (B) may be considered. If (B) yields a smaller total cost than (A), the sub-trees generated by (A) may be checked. This action may be repeated until the cost of (B) exceeds that of (A).

Two kinds of partitioning may be defined: horizontal partitioning and vertical partitioning. In horizontal partitioning, one AWG may be replaced by two parallel AWGs with smaller sizes (e.g., from FIG. 2A to FIG. 2B). In vertical partitioning, one AWG may be replaced by a two-stage cascaded AWG with smaller sizes (e.g., from FIG. 2C to FIG. 2D). In an example method, recursive-partitioning may determine the distribution AWGs and connects these distribution AWGs using cascaded 1×2 intermediate AWGs. Recursive combination may optimize these intermediate AWGs. These 1×2 AWGs may be combined from the back stages to the front stages.

Similarly, two types of combination may be defined in an example embodiment: horizontal combination and vertical combination. The horizontal and vertical combinations may be the reverse processes of the horizontal and vertical partitioning, respectively.

Figure 6A:
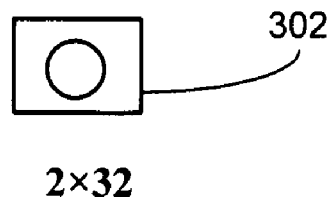
FIGS. 6A-6F are schematic diagrams depicting example arrangements of AWGs at various times during the implementation of an example recursive tree partition and combination process.
Figure 6B:
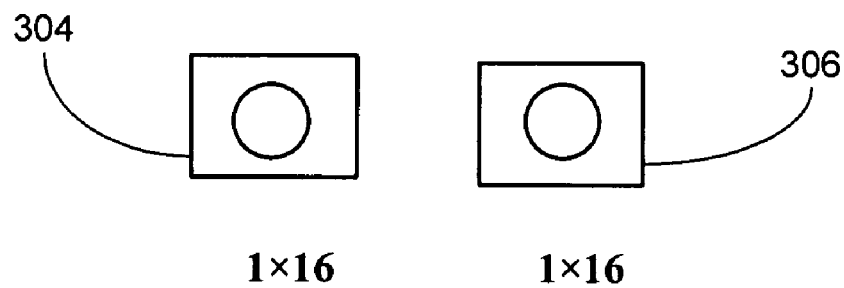
Figure 6C:
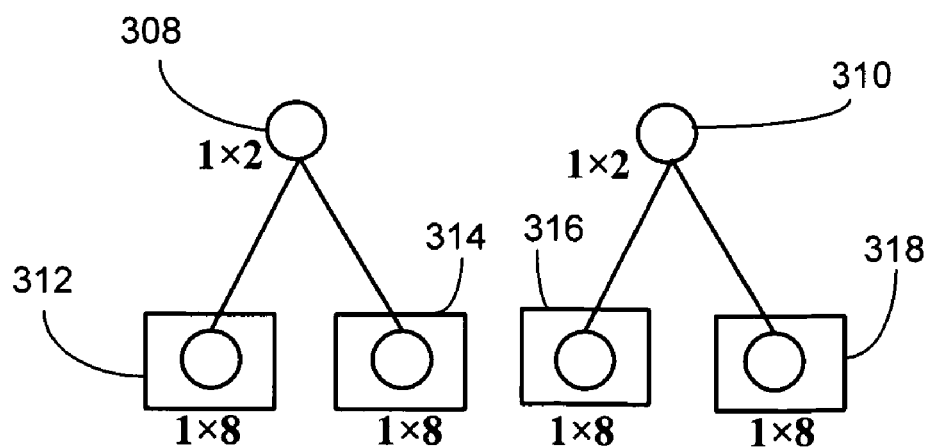
Figure 6D:
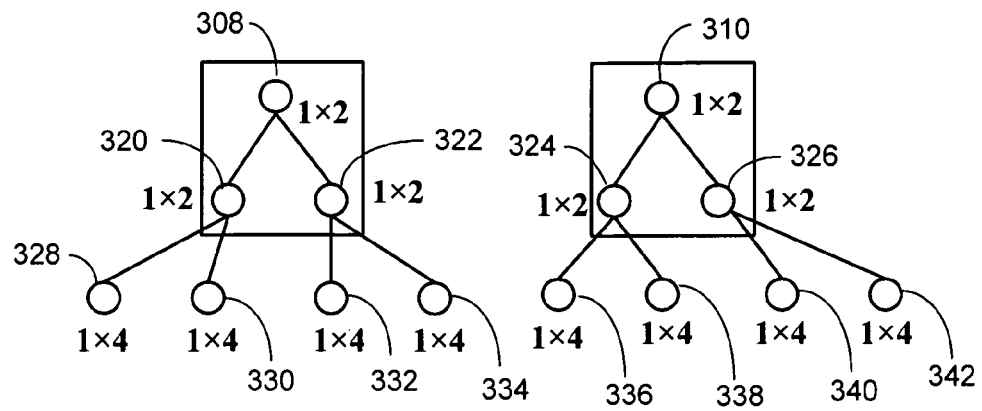
Figure 6E:
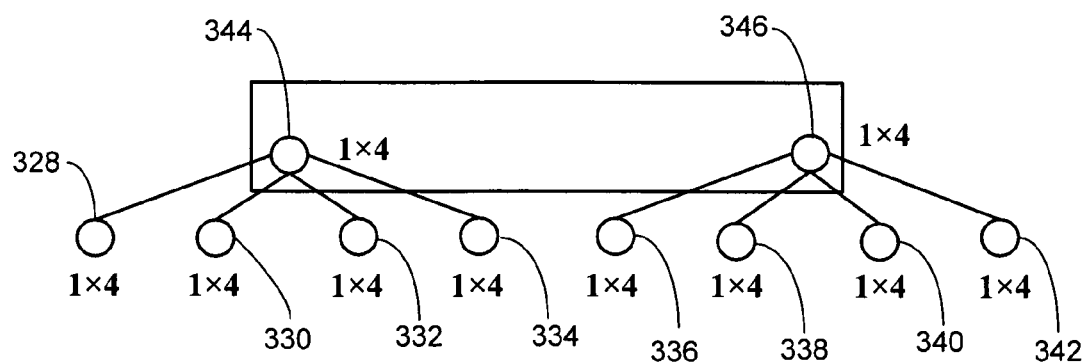
Figure 6F:
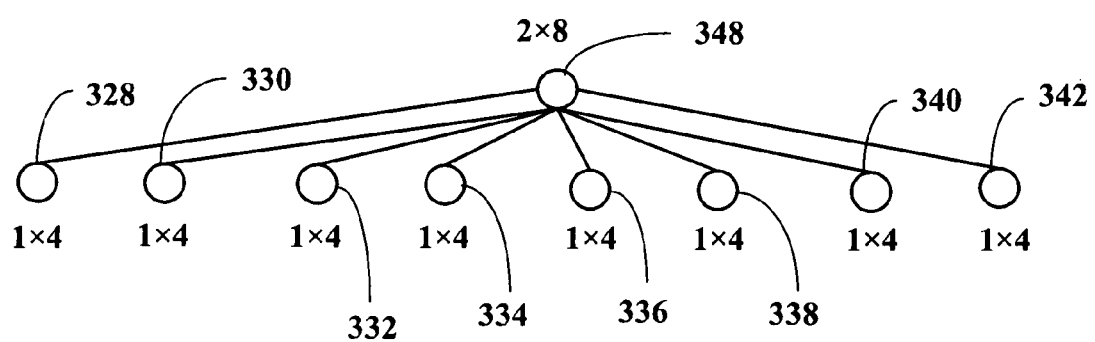

FIGS. 6A-6F are schematic diagrams depicting example arrangements of AWGs at various times during the implementation of an example recursive tree partition and combination process. In FIG. 6A, a 2×32 AWG 302 is depicted. Through horizontal partitioning, the 2×32 AWG 302 becomes two parallel 1×16 AWGs 304, 306 as shown in FIG. 6B. Through vertical partitioning, one or more 1×16 AWG 304, 306 becomes a 1×2 AWG 308, 310 connected to two 1×8 AWGs 312, 314, 316, 318 in a cascaded arrangement as shown in FIG. 6C. Through further vertical partitioning, one or more 1×8 AWG 312, 314, 316, 318 becomes a 1×2 AWG 320, 322, 324, 326 connected to two 1×4 AWGs 328, 330, 332, 334, 336, 338, 340, 342 in a cascaded arrangement as shown in FIG. 6D. Through vertical combination, one or more sets of cascaded 1×2 AWGs 308, 310, 320, 322, 324, 326 becomes a single 1×4 AWG 344, 346 as shown in FIG. 6E. Finally, through horizontal combination, the two higher level 1×4 AWGs 344, 346 are combined into a single 2×8 AWG 348 as shown in FIG. 6F. Thus, the resulting arrangement is a 2×8 AWG 348 connected to eight 1×4 AWGs 328, 330, 332, 334, 336, 338, 340, 342, which may provide the same and/or similar demultiplexing function as the 2×32 AWG 302 of FIG. 6A.

Several factors impacting an example partitioning and combination are discussed below. Let t be the tree to be partitioned, $t_1$ and $t_2$ be the two partitioned subtrees, f be the fiber unit cost, d(x) be the average distance between the outputs and the centroid of tree x, and m be the number of outputs. If one 1×m AWG is adopted, the cost $C_1$ may be p(m)+fmd(t). If the combination of one 1×2 AWG and two 1×m/2 AWGs is adopted, the average distances between the 1×m/2 AWGs and their corresponding subscribers may be $d(t_1)$, and $d(t_2)$, respectively. In addition, the connection of the three AWGs may utilize two fibers with lengths $d_1$ and $d_2$. Then, the cost $C_2$ may be $2p(m/2)+p(2)+f[m(d(t_1)+d(t_2))/2+d_1+d_2]$. Therefore, the condition of accepting partition may be given by the following inequality.

$$m\left(\frac{p(m/2)}{m/2} - \frac{p(m)}{m}\right) + p(2) < f[md(t) - m(d(t_1) + d(t_2))/2 - d_1 - d_2]$$

The function d(y) may be determined by the shape of the tree and the subscriber distribution. For illustrative purposes, consider two extreme cases of the tree shape.

In Case 1, t may be restricted to a line where outputs may be uniformly and/or nearly uniformly distributed along the tree. Define a, the density, as the number of points per unit length.

$$d(t) = \frac{m}{4a}, \quad d(t_1) = \frac{m}{8a}, \quad d(t_2) = \frac{m}{8a}$$

The condition of accepting the partition becomes the following inequality.

$$m\left(\frac{p(m/2)}{m/2} - \frac{p(m)}{m}\right) + p(2) < \frac{fm}{2a}(m/4 - 1)$$

In Case 2, t may extend everywhere in a disc (e.g., instead of a tree in the form of a line with uniformly and/or nearly uniformly distributed outputs along its length as in Case 1, the disc refers to the shape of the tree covering an area, such as a circular area). The outputs may be uniformly and/or nearly uniformly distributed. Assume areas covered by t, $t_1$, $t_2$ may be all discs, and a may represent the number of points per unit area. The condition becomes the following inequality.

$$m\left(\frac{p(m/2)}{m/2} - \frac{p(m)}{m}\right) + p(2) < f\sqrt{\frac{2}{\pi a}}\left(\frac{\sqrt{2}-1}{3}m^{3/2} - m^{1/2}\right)$$

In both cases, partitioning may be encouraged with low AWG cost, high fiber unit cost, and small point density. Decreasing m disfavors partitioning. Partitioning may be more likely to be performed in case 2 than in case 1 since the decrease of the fiber cost may be slower in case 2. The tree combination process may be analyzed in similar fashion. Different from partitioning, combination may be less favorable with high fiber unit cost, small AWG cost, and low density.

The example methods described herein refer to partitioning, combining, etc. in a mathematical or virtual sense (e.g., conceptually). In other words, the example methods may be performed without physically reconfiguring an optical network at each action; generally, the partitioning, combining, etc. may be performed as part of the design process of the optical network, and physical construction or modification of the optical network may occur once an arrangement is determined using an example method.

FIG. 7 is a flowchart depicting the operation of an example computer-implemented method of determining an arrangement of an optical network. Action 402 may include partitioning an optical network tree into a plurality of subtrees, one or more of said plurality of subtrees including a distribution array waveguide grating connected to a plurality of subscribers and to a network optical line termination. Action 404 may include horizontally partitioning at least one subtree by replacing at least one of a multiple-input/multiple-output intermediate array waveguide grating and a multiple-input/multiple-output distribution array waveguide grating with an equivalent arrangement of single-input/multiple-output array waveguide gratings. Action 406 may include vertically partitioning at least one subtree by selectively replacing at least one of the single-input/multiple-output array waveguide gratings with a respective equivalent cascaded arrangement including a single-input/double-output array waveguide grating and two or more smaller single-input/multiple-output array waveguide gratings, where one or more of the smaller single-input/multiple-output array waveguide gratings includes fewer outputs than the respective one single-input/multiple-put array waveguide grating. Action 408 may include vertically combining at least one subtree by selectively replacing at least one cascaded arrangement of at least three single-input/multiple-output intermediate array waveguide gratings with an equivalent single-input/multiple-output array waveguide grating. Action 410 may include horizontally combining at least one subtree by selectively replacing at least two intermediate array waveguide gratings connected nearest the network optical line termination with an equivalent multiple-input/multiple-output array waveguide grating.

FIG. 8 is a flowchart depicting an example computer-implemented method of determining an arrangement of an optical network. Action 412 may include calculating a first arrangement of a plurality of array waveguide gratings and fibers interconnecting an optical line termination and a plurality of subscribers to minimize a fiber cost, the first arrangement including a plurality of subtrees. Action 414 may include calculating a second arrangement of array waveguide gratings having a minimum total cost of array waveguide gratings and fibers, which may include recursively partitioning at least one subtree 416, recursively vertically combining at least one subtree 418, and horizontally combining at least one subtree 420.

Figure 9:
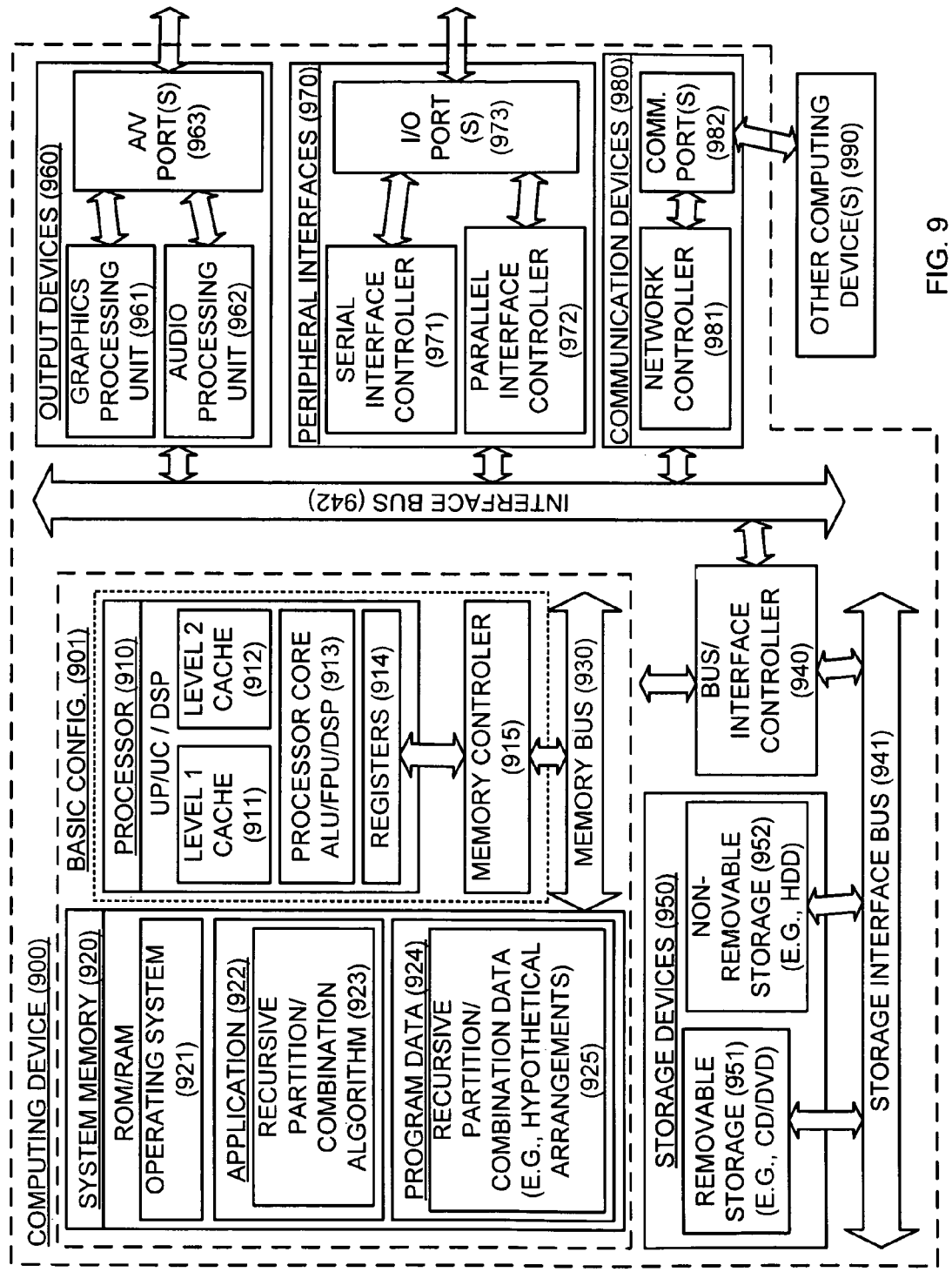
FIG. 9 is a block diagram illustrating an example computer device that is arranged for determining a network configuration, all arranged in accordance with the present disclosure.
Figure 9:
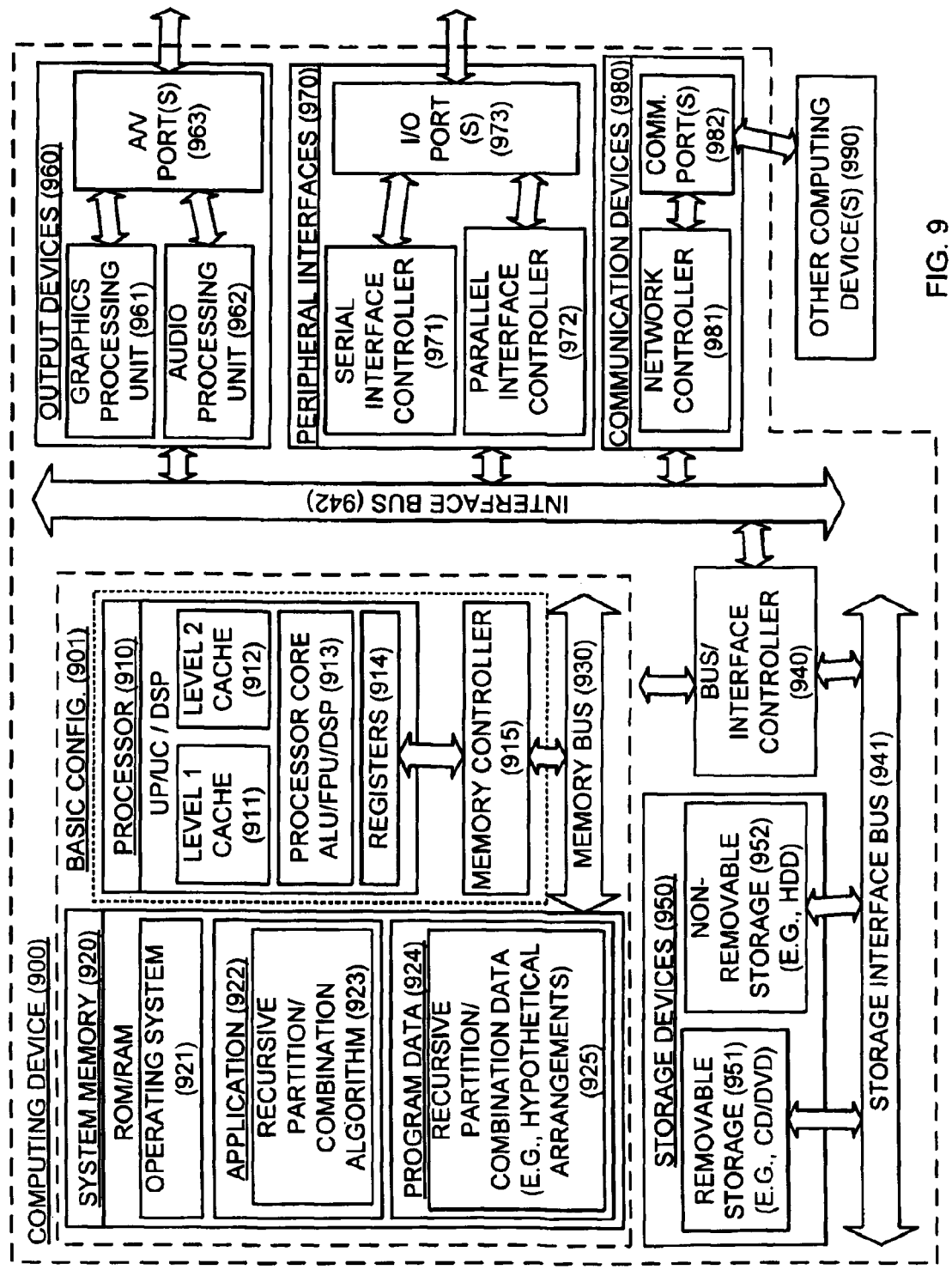

FIG. 9 is a block diagram illustrating an example computing device 900 that is arranged for determining a network configuration in accordance with the present disclosure. In a very basic configuration 901, computing device 900 typically includes one or more processors 910 and system memory 920. A memory bus 930 can be used for communicating between the processor 910 and the system memory 920. The example methods depicted in FIGS. 8 and 9 may be implemented using computing device 900, for example.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a recursive partition/combination algorithm 923 that is arranged to determine a configuration for a network. Program Data 924 includes recursive partition/combination data 925 (such as costs for fiber and AWGs, one or more hypothetical arrangements of AWGs and fibers, available AWG configurations, etc.) that is useful for determining a network configuration as described herein. In some embodiments, application 922 can be arranged to operate with program data 924 on an operating system 921 such that a network configuration may be determined.

The described basic configuration is illustrated in FIG. 9 by those components within dashed line 901. Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that a favorable vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely example, and that in fact many other architectures can be implemented which may achieve the same and/or similar functionality. In a conceptual sense, any arrangement of components to achieve the same and/or similar functionality is effectively "associated" such that a target functionality may be achieved. Hence, any two components herein combined to achieve a particular functionality can be seen as "associated with" each other such that a target functionality may be achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve a target functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It should also be understood that, while a stated intention of various example embodiments disclosed herein is to "minimize" the capital expenditure of array waveguide gratings and fibers, it is not necessary to literally minimize any expenditure or any other factor to fall within the scope of any claim unless such specific intention is expressly claimed. For example, it is within the scope of the disclosure to identify an arrangement of AWGs and fibers having a cost lower than another arrangement, even when yet another potential arrangement having an even lower costs may exist. Likewise, it should be understood that it is not necessary to literally "optimize" a tradeoff between the AWG cost and fiber cost to fall within the scope of any claim unless such specific objective is expressly claimed. For example, it is within the scope of the disclosure to identify an arrangement of AWGs and fibers in consideration of a tradeoff between AWG cost and fiber cost which has a cost lower than another arrangement, even when yet another potential arrangement having an even lower cost may exist. Such situations may occur, for example, when some potential lower cost arrangements may be beyond the scope of the analysis, such as when some portions of a WDM PON include existing infrastructure.

What is claimed is:

1. A computer-implemented method of determining an arrangement of an optical network, the method comprising:
   partitioning an optical network tree into a plurality of subtrees, one or more of the plurality of subtrees including a distribution array waveguide grating connected to a plurality of subscribers and to a network optical line termination;
   horizontally partitioning at least one subtree by replacing at least one of a multiple-input/multiple-output intermediate array waveguide grating and a multiple-input/multiple-output distribution array waveguide grating with an equivalent arrangement of single-input/multiple-output array waveguide gratings;
   vertically partitioning at least one subtree by selectively replacing at least one of the single-input/multiple-output array waveguide gratings with a respective equivalent cascaded arrangement including a single-input/double-output array waveguide grating and two or more smaller single-input/multiple-output array waveguide gratings, where one or more of the smaller single-input/multiple-output array waveguide gratings includes fewer outputs than the respective one single-input/multiple-put array waveguide grating;
   vertically combining at least one subtree by selectively replacing at least one cascaded arrangement of at least three single-input/multiple-output intermediate array waveguide gratings with an equivalent single-input/multiple-output array waveguide grating; and
   horizontally combining at least one subtree by selectively replacing at least two intermediate array waveguide gratings connected nearest the network optical line termination with an equivalent multiple-input/multiple-output array waveguide grating.

2. The method of claim 1, wherein horizontally partitioning includes replacing all of the multiple-input/multiple-output intermediate array waveguide gratings and all of the multiple-input/multiple-output distribution array waveguide gratings with equivalent arrangements of single-input/multiple-output array waveguide gratings.

3. The method of claim 1, wherein vertically partitioning includes replacing at least one single-input/multiple-output array waveguide grating for which a respective equivalent cascaded arrangement has a lower cost.

4. The method of claim 3, wherein vertically partitioning includes calculating a cost of a current arrangement, hypothetically replacing one of the single-input/multiple-output array waveguide gratings with a hypothetical equivalent cascaded arrangement, calculating a hypothetical cost, and, if the hypothetical cost is less than the cost of the current arrangement, replacing the one of the single-input/multiple-output array waveguide gratings with the hypothetical equivalent cascaded arrangement.

5. The method of claim 4, wherein the cost of the current arrangement and the hypothetical cost include costs of the respective array waveguide gratings and costs of optical fibers.

6. The method of claim 1, wherein vertically combining includes replacing the cascaded arrangement of the three single-input/multiple-output intermediate array waveguide gratings with the equivalent single-input/multiple-output array waveguide grating if costs associated with the equivalent single-input/multiple-output array waveguide grating are less than costs associated with the cascaded arrangement of the three single-input/multiple-output intermediate array waveguide gratings.

7. The method of claim 6, wherein the costs associated with the equivalent single-input/multiple-output array waveguide grating and the costs associated with the cascaded arrangement of the three single-input/multiple-output intermediate array waveguide gratings include costs of the respective array waveguide gratings and costs of optical fibers.

8. The method of claim 1, wherein horizontally combining includes replacing at least two intermediate array waveguide gratings connected nearest the network optical line termination with an equivalent multiple-input/multiple-output array waveguide grating if costs associated with the equivalent multiple-input/multiple-output array waveguide grating are less than costs associated with the intermediate array waveguide gratings connected nearest the network optical line termination.

9. The method of claim 8, wherein the costs associated with the equivalent multiple-input/multiple-output array waveguide grating and the costs associated with the intermediate array waveguide gratings connected nearest the network optical line termination include costs of the respective array waveguide gratings and costs of optical fibers.

10. The method of claim 1, wherein partitioning the optical network tree into the plurality of subtrees includes, for at least one subtree, locating the respective distribution array waveguide grating at a centroid of the respective subtree.

11. A computer-implemented method of determining an arrangement of an optical network, the method comprising:
   calculating a first arrangement of a plurality of array waveguide gratings and fibers interconnecting an optical line termination and a plurality of subscribers to minimize a fiber cost, the first arrangement including a plurality of subtrees;
   calculating a second arrangement of array waveguide gratings having a minimum total cost of array waveguide gratings and fibers by
      recursively partitioning at least one subtree by iteratively calculating a cost of a first current arrangement, partitioning the first current arrangement into a first test arrangement, calculating a cost of the first test arrangement, setting the first test arrangement as the first current arrangement for a subsequent iteration if the cost of the first test arrangement is less than the cost of the first current arrangement, and ending the partitioning if the cost of the first test arrangement exceeds the cost of the first current arrangement, recursively vertically combining at least one subtree by iteratively calculating a cost of a second current arrangement, defining a second test arrangement by combining three connected array waveguide gratings into a combined waveguide grating, calculating a cost of the second test arrangement, setting the second test arrangement as the second current arrangement for a subsequent iteration if the cost of the second test arrangement is less than the cost of the second current arrangement, and ending the vertically combining if the cost of the second test arrangement exceeds the cost of the second current arrangement, horizontally combining at least one subtree by iteratively calculating a cost of a third current arrangement, defining a third test arrangement by combining two array waveguide gratings in the subtree connected nearest the optical line termination into a single, calculating a cost of the third test arrangement, setting the third test arrangement as the third current arrangement for a subsequent iteration if the cost of the third test arrangement is less than the cost of the third current arrangement, and ending the horizontally combining if the cost of the third test arrangement exceeds the cost of the third current arrangement; and outputting the second arrangement of array waveguide gratings.

12. The method of claim 11, wherein recursively partitioning at least one subtree includes replacing one of the array waveguide gratings in the subtree with two parallel array waveguide gratings having smaller sizes.

13. The method of claim 11, wherein recursively partitioning at least one subtree includes replacing one of the array waveguide gratings in the subtree with a cascaded arrangement of three array waveguide gratings having smaller sizes.

14. The method of claim 13, wherein calculating the first arrangement of the plurality of array waveguide gratings and fibers includes partitioning the optical network tree into the plurality of subtrees based at least in part on a heuristic bottom-up algorithm to determine which of the subscribers are connected to at least one subtree.

15. The method of claim 14, wherein partitioning the optical network tree into the plurality of subtrees includes, for at least one subtree, locating a respective distribution array waveguide grating at a centroid of the respective subtree.

16. A cascaded AWG network comprising an arrangement of a plurality of cascaded AWGs, wherein the arrangement is determined, at least in part, upon the following:

a calculated first arrangement of a plurality of array waveguide gratings and fibers interconnecting an optical line termination and a plurality of subscribers to minimize a fiber cost, the first arrangement including a plurality of subtrees;

a calculated second arrangement of array waveguide gratings having a minimum total cost of array waveguide gratings and fibers obtained by:

recursive partition of at least one subtree by iterative calculation of a cost of a first current arrangement, partition of the first current arrangement into a first test arrangement, calculation of a cost of the first test arrangement, designation of the first test arrangement as the first current arrangement for a subsequent iteration if the cost of the first test arrangement is less than the cost of the first current arrangement, and termination of the recursive partition if the cost of the first test arrangement exceeds the cost of the first current arrangement;

recursive vertical combination of at least one subtree by iterative calculation of a cost of a second current arrangement, definition of a second test arrangement by combination of three connected array waveguide gratings into a combined waveguide grating, calculation of a cost of the second test arrangement, designation of the second test arrangement as the second current arrangement for a subsequent iteration if the cost of the second test arrangement is less than the cost of the second current arrangement, and termination of the vertical combination if the cost of the second test arrangement exceeds the cost of the second current arrangement; and horizontal combination of at least one subtree by iterative calculation of a cost of a third current arrangement, definition of a third test arrangement by combination of two array waveguide gratings in the subtree connected nearest the optical line termination into a single, calculation of a cost of the third test arrangement, designation of the third test arrangement as the third current arrangement for a subsequent iteration if the cost of the third test arrangement is less than the cost of the third current arrangement, and termination of the horizontal combination if the cost of the third test arrangement exceeds the cost of the third current arrangement.

17. The cascaded AWG network of claim 16, wherein the recursive partition of at least one subtree includes replacement of one of the array waveguide gratings in the subtree with two parallel array waveguide gratings having smaller sizes.

18. The cascaded AWG network of claim 16, wherein the recursive partition of at least one subtree includes replacement of one of the array waveguide gratings in the subtree with a cascaded arrangement of three array waveguide gratings having smaller sizes.

19. The cascaded AWG network of claim 16, wherein the calculated first arrangement of the plurality of array waveguide gratings and fibers includes the optical network tree partitioned into the plurality of subtrees based at least in part on a heuristic bottom-up algorithm to determine which of the subscribers are connected to at least one subtree.

20. The cascaded AWG network of claim 19, wherein the partition of the optical network tree into the plurality of subtrees includes, for at least one subtree, location of a respective distribution array waveguide grating at a centroid of the respective subtree.

21. An article comprising:

a computer storage medium comprising machine-readable instructions stored thereon, which, if executed by one or more processors, operatively enable a computing device to:

calculate a first arrangement of a plurality of array waveguide gratings and fibers interconnecting an optical line termination and a plurality of subscribers to minimize a fiber cost, the first arrangement including a plurality of subtrees;

calculate a second arrangement of array waveguide gratings having a minimum total cost of array waveguide gratings and fibers by:

recursive partition of at least one subtree by iterative calculation of a cost of a first current arrangement, partition of the first current arrangement into a first test arrangement, calculation of a cost of the first test arrangement, designation of the first test arrangement as the first current arrangement for a subsequent iteration if the cost of the first test arrangement is less than the cost of the first current arrangement, and termination of the recursive partition if the cost of the first test arrangement exceeds the cost of the first current arrangement;

recursive vertical combination of at least one subtree by iterative calculation of a cost of a second current arrangement, definition of a second test arrangement by combination of three connected array waveguide gratings into a combined waveguide grating, calculation of a cost of the second test arrangement, designation of the second test arrangement as the second current arrangement for a subsequent iteration if the cost of the second test arrangement is less than the cost of the second current arrangement, and termination of the vertical combination if the cost of the second test arrangement exceeds the cost of the second current arrangement; and horizontal combination of at least one subtree by iterative calculation of a cost of a third current arrangement, definition of a third test arrangement by combination of two array waveguide gratings in the subtree connected nearest the optical line termination into a single, calculation of a cost of the third test arrangement, designation of the third test arrangement as the third current arrangement for a subsequent iteration if the cost of the third test arrangement is less than the cost of the third current arrangement, and termination of the horizontal combination if the cost of the third test arrangement exceeds the cost of the third current arrangement.

22. The article of claim 21, wherein the recursive partition of at least one subtree includes replacement of one of the array waveguide gratings in the subtree with two parallel array waveguide gratings having smaller sizes.

23. The article of claim 21, wherein the recursive partition of at least one subtree includes replacement of one of the array waveguide gratings in the subtree with a cascaded arrangement of three array waveguide gratings having smaller sizes.

24. The article of claim 21, wherein the calculate the first arrangement of the plurality of array waveguide gratings and fibers includes partition of an optical network tree into the plurality of subtrees based at least in part on a heuristic bottom-up algorithm to determine which of the subscribers are connected to at least one subtree.

25. The article of claim 24, wherein the partition of the optical network tree into the plurality of subtrees includes, for at least one subtree, location of a respective distribution array waveguide grating at a centroid of the respective subtree.

* * * * *

UNITED STATES PATENT AND TRADEMARK OFFICE
CERTIFICATE OF CORRECTION

PATENT NO. : 8,095,006 B2
APPLICATION NO. : 12/389909
DATED : January 10, 2012
INVENTOR(S) : Ansari et al.

It is certified that error appears in the above-identified patent and that said Letters Patent is hereby corrected as shown below:

On the Title Page, in item (56), under "OTHER PUBLICATIONS", in Column 2, Line 5, delete "gigabitaccess" and insert -- gigabit access --, therefor.

On the Title Page, in item (56), under "OTHER PUBLICATIONS", in Column 2, Line 9, delete "Lightwav," and insert -- Lightwave --, therefor.

In the Drawings:
In Fig. 7, Sheet 12 of 14, for Tag "406", in Line 7, delete "input/multiple-put" and insert -- input/multiple-output --, as shown on the attached sheets.

In Fig. 9, Sheet 14 of 14, in Box "915", in Line 1, delete "CONTROLER" and insert -- CONTROLLER --, as shown on the attached sheets.

In the Specifications:
In Column 6, Line 23, delete "[+" and insert -- +[ --, therefor.

In Column 7, Line 28, delete "$d_2$)" and insert -- $d_2$] --, therefor.

In Column 9, Line 44, delete "(HDD)," and insert -- (HDDs), --, therefor.

In Column 9, Line 46, delete "(SSD)," and insert -- (SSDs), --, therefor.

In Column 9, Line 56, delete "(DVD)" and insert -- (DVDs) --, therefor.

In the Claims:
In Column 13, Line 46, in Claim 1, delete "single-input/multiple-put" and insert -- single-input/multiple-output --, therefor.

Signed and Sealed this
Twenty-seventh Day of August, 2013

Teresa Stanek Rea
*Acting Director of the United States Patent and Trademark Office*

```
┌─────────────────────────────────────────────────────────────────────┐
│ partitioning an optical network tree into a plurality of subtrees,  │
│ one or more of said plurality of subtrees including a distribution  │
│ array waveguide grating connected to a plurality of subscribers and │
│ to a network optical line termination                               │
└─────────────────────────────────────────────────────────────────────┘
                              │
                              ▼  402
┌─────────────────────────────────────────────────────────────────────┐
│ horizontally partitioning at least one subtree by replacing at      │
│ least one of a multiple-input/multiple-output intermediate array    │
│ waveguide grating and a multiple-input/multiple-output distribution │
│ array waveguide grating with an equivalent arrangement of           │
│ single-input/multiple-output array waveguide gratings               │
└─────────────────────────────────────────────────────────────────────┘
                              │
                              ▼  404
┌─────────────────────────────────────────────────────────────────────┐
│ vertically partitioning at least one subtree by selectively         │
│ replacing at least one of the single-input/multiple-output array    │
│ waveguide gratings with a respective equivalent cascaded            │
│ arrangement including a single-input/double-output array waveguide  │
│ grating and two or more smaller single-input/multiple-output array  │
│ waveguide gratings, where one or more of the smaller                │
│ single-input/multiple-output array waveguide gratings includes      │
│ fewer outputs than the respective one single-input/multiple-output  │
│ array waveguide grating                                             │
└─────────────────────────────────────────────────────────────────────┘
                              │
                              ▼  406
┌─────────────────────────────────────────────────────────────────────┐
│ vertically combining at least one subtree by selectively replacing  │
│ at least one cascaded arrangement of at least three                 │
│ single-input/multiple-output intermediate array waveguide gratings  │
│ with an equivalent single-input/multiple-output array waveguide     │
│ grating                                                             │
└─────────────────────────────────────────────────────────────────────┘
                              │
                              ▼  408              410
┌─────────────────────────────────────────────────────────────────────┐
│ horizontally combining at least one subtree by selectively          │
│ replacing at least two intermediate array waveguide gratings        │
│ connected nearest the network optical line termination with an      │
│ equivalent multiple-input/multiple-output array waveguide grating   │
└─────────────────────────────────────────────────────────────────────┘
```

FIG. 7